United States Patent [19]

Miller

[11] 4,187,938
[45] Feb. 12, 1980

[54] ELECTROMAGNETIC CLUTCH WITH ANTI-JAM CAM ACTUATION

[75] Inventor: Donald L. Miller, Horseheads, N.Y.

[73] Assignee: Facet Enterprises, Inc., Tulsa, Okla.

[21] Appl. No.: 855,114

[22] Filed: Nov. 28, 1977

[51] Int. Cl.² .................... F16D 27/10; F16D 7/00
[52] U.S. Cl. .................................. 192/54; 64/30 C; 192/84 C
[58] Field of Search ............... 192/54, 84 C; 64/30 R, 64/30 C

[56] References Cited

U.S. PATENT DOCUMENTS

| 3,251,441 | 5/1966 | Winter | 192/54 X |
| 4,079,821 | 3/1978 | Miller | 192/54 X |

*Primary Examiner*—Allan D. Herrmann
*Attorney, Agent, or Firm*—Remy J. VanOphem

[57] ABSTRACT

A cam actuated clutch of the type in which an armature is drawn into engagement with pole faces formed on a rotatable input member by energization of an electromagnetic coil. The armature is drivingly engaged with an input member by a plurality of balls cooperating with conical recesses formed in opposing radial surfaces, while the torque transmitted through the clutch by engagement of the armature causes a camming action between the balls and recesses by relative rotative and axial movement between the member surfaces formed with the recesses, urging the armature into tight engagement with the pole faces. The anti-jam feature consists of an arrangement for limiting the camming forces generated between the balls and the recesses by creating a spring force resisting the relative axial movement between an intermediate member formed with one set of the conical recesses, with the opposing set of conical recesses formed in the armature. A positive stop prevents relative movement after a predetermined relative travel between the intermediate member and the armature to limit the camming force to the level produced by the spring upon engagement of the positive stop.

The positive stop acts to limit relative rotation by pins passing through openings in the armature sized to allow a predetermined extent of relative rotation to limit the camming action.

The intermediate member comprises a spline plate, splined to the input member so as to be rotatably connected thereto while accommodating the axial movement caused by the camming actuation.

7 Claims, 3 Drawing Figures

ELECTROMAGNETIC CLUTCH WITH ANTI-JAM CAM ACTUATION

BACKGROUND OF THE INVENTION

1. Field of the Invention

This invention concerns cam actuation clutch or brake devices and more particularly electromagnetic clutching arrangements including a camming ball-recess combination in which the torque transmitted through the clutch is exerted on the ball so that the camming forces increase with increasing torque levels. The camming force increases the engagement force of an armature moved into engagement by an electromagnetic coil.

2. Description of the Prior Art

In copending application Ser. No. 686,854 filed May 17, 1976, there is disclosed an electromagnetic coil operated clutch in which an armature is axially moved into engagement with radially spaced pole faces formed on an input member inner body upon energization of an electromagnetic coil. The armature is drivingly connected to the output member by means of a plurality of balls disposed in conical recesses within the armature and on an opposing radial face formed on the output member. The camming action of the balls in the recesses, upon engagement of the armature with the input member, locks up the clutch, and the balls themselves transmit the maximum torque from the armature into the output member. This arrangement produces an extremely rapid action but the transmission of torque by the balls tend to limit the torque levels which can be safely and reliably transmitted. This is due to variations in the recess geometry produced in manufacturing and variations in the frictional coefficients which may produce failures to release at high torque levels due to jamming of the balls or damage to the components such as tearing of the pole faces.

It is the object of the present invention to provide such a clutch in which the maximum torque is transmitted through balls, but in which the camming action is torque limited to allow the transmission of relatively high torque levels without the danger of jamming lock-up.

SUMMARY OF THE INVENTION

This and other objects which will become apparent upon a reading of the following specification and claims are accomplished by an arrangement which limit the engagement force generated by the cam actuation. This arrangement includes an intermediate member splined to the input member and formed with one of the conical recess sets and in which the armature is formed with the other conical recess set. The relative axial movement between the intermediate member and the armature occurring by virtue of the camming of the balls in the recesses upon clutch actuation is opposed by a spring bias force. After a predetermined extent of relative axial movement against the spring bias, a positive stop prevents further relative movement between the armature and the intermediate member to thereby limit the camming force to the level of spring force existing upon engagement of the positive stop. The positive stop is provided by a plurality of pins riveted to the intermediate member and extending into holes formed in the armature with a predetermined radial clearance such as to limit the extent of relative rotative movement between the armature and the intermediate member.

DETAILED DESCRIPTION

Figure 1:
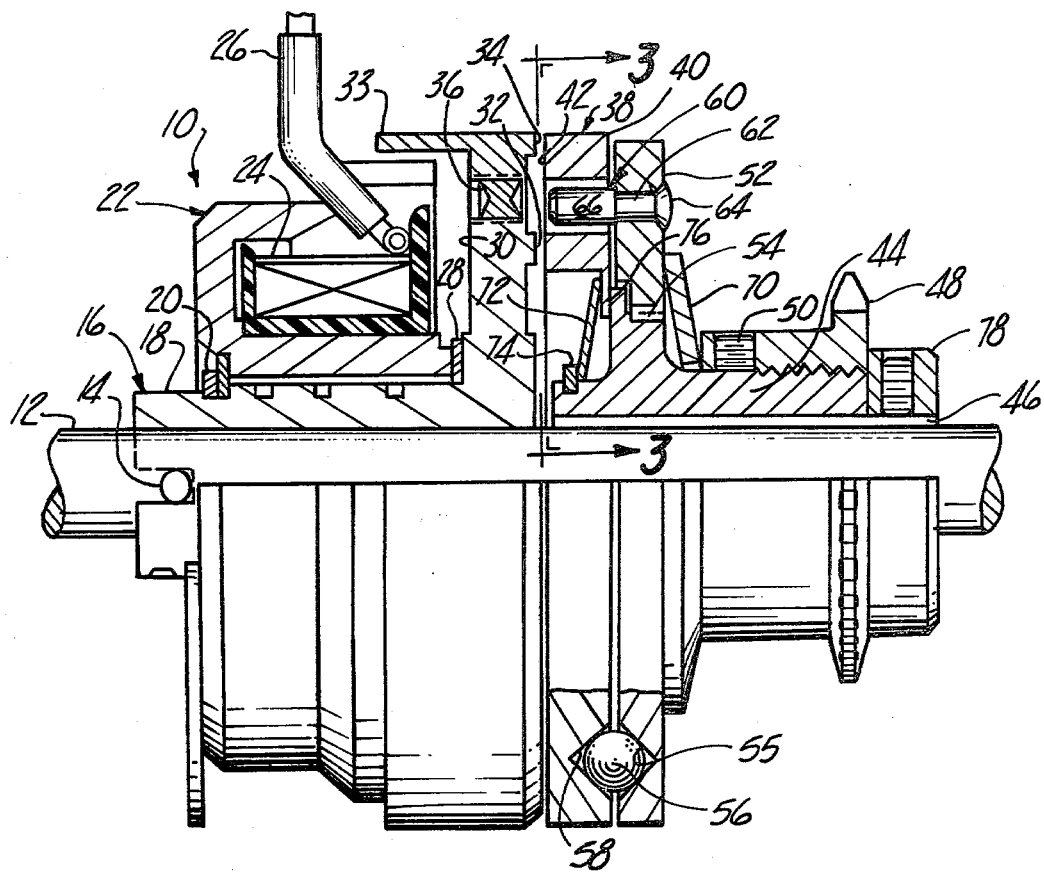
FIG. 1 is a longitudinal partially sectional view of an electromagnetic clutch according to the present invention.
Figure 2:
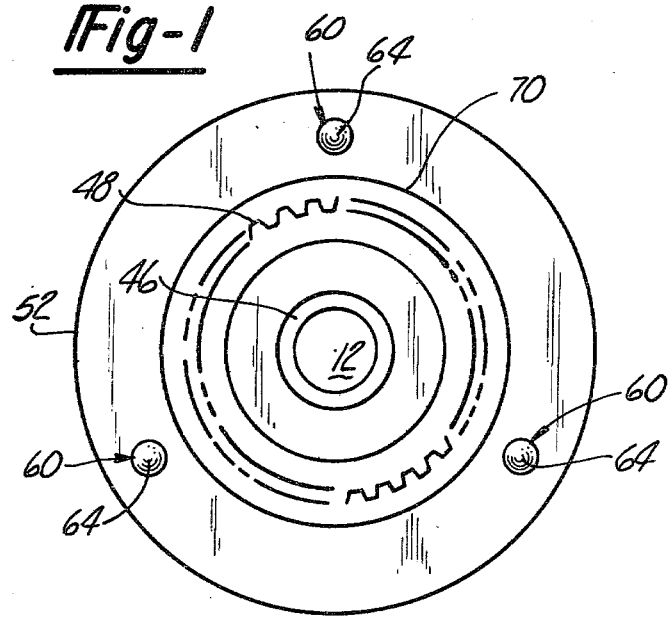
FIG. 2 is an endwise view of the clutch shown in FIG. 1.

Referring to the drawings and particularly FIGS. 1 and 2, the clutch 10 according to the present invention is shown.

An output shaft 12 is pinned at 14 to a first clutch member or output member 16 and so as to rotate together. A hub portion 18 is axially located by means of snap retainers 20 to a stationary coil housing 22, which mounts an electromagnetic coil 24, adapted to be energized via leads 26 by means of an external power supply and controls (not shown).

A thrust washer 28 serves to axially locate the front portion of the output member 16 and absorb the axial thrust exerted thereon during actuation of the clutch 10, the thrust washer 28 being located between a shoulder formed on a radially extending flange 30 integral with the output member 16.

The radially extending flange 30 is formed with an annular pole face 32, and with a second pole face 34 formed on an outer ferromagnetic ring 33 separated by a nonmagnetic separator ring 36 from the flange 30 so as to allow a magnetic flux path to be set up into an armature 38 upon energization of the electromagnetic coil 24. The outer ring 33, the separator ring 36 and the output member 16 are joined together to be an integral unit so as to rotate together.

The armature 38, mounted coaxially with the output shaft 12 and the output member 16, is formed with an outer rim 40 having a radial face 42 to be engaged with the pole faces 32 and 34 upon energization of the electromagnetic coil 24. The armature 38 is constructed of a ferromagnetic material such as steel for this purpose.

A second clutch member or input hub member 44 is rotatably mounted on the output shaft 12 by means of a bearing 46, and has an input sprocket 48 mounted thereon affixed thereto by means of a set screw 50.

An intermediate member is provided taking the form of an annular spline plate 52, splined at 54 to the input hub member 44 so as to be relatively movable axially while rotatably connected with the input hub member 44.

The spline plate 52 is formed with a plurality of conical recesses 55, with cam balls 56 disposed therein and in oppositely disposed conical recesses 58 formed in the armature 38.

A plurality of pins 60 arranged circumferentially equispaced, are fixed to the spline plate 52 by having a smaller diameter portion 62 riveted at 64 in holes formed in the spline plate 52.

Figure 3:
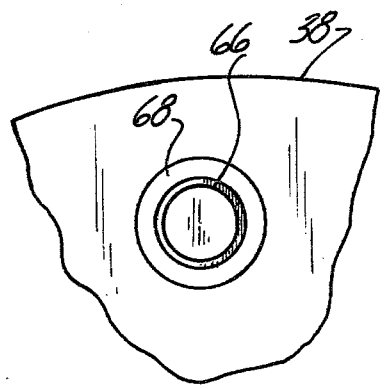
FIG. 3 is a fragmentary endwise view of the assembly shown in FIG. 1 in the direction of the arrows 3—3.

A large diameter portion 66 of each pin 60 extends into holes 68 formed in the armature 38, which holes 68 are of significantly greater diameter than the large diameter 66 portions 66 of the pins 60, (FIG. 3) which allows a predetermined extent of relative rotation between the armature 38 and the spline plate 52, after which a positive engagement takes place. This provides a position stop preventing further relative rotative movement between the spline plate 52 and armature 38.

A Belleville or washer spring 70 is provided positioned between the spline plate 52 and the sprocket 48 affixed to the input hub member 44 providing an axially fixed reaction point, which exerts an axial spring bias force on the spline plate 52 as the spline plate 52 attempts to move to the right as viewed in FIG. 1 under the influence of the camming action of the balls 56.

This axial force is transmitted directly through the balls 56 into the armature 38, forcing it into tighter engagement with the pole faces 32 and 34 of the output member 16 after energization of the coil 24.

After a predetermined extent of relative rotation, the portions 66 of the pins 60 engage the side walls of the holes 68, absorbing any additional torque levels and limiting the camming action to that existing at that point.

At the same time, the axial force continues to be exerted by the washer spring 70 to thus maintain the camming force at this maximum level.

An armature return spring 72 is provided seated against a retainer 74 to return the armature 38 after deenergization of the coil 24. The armature 38 abuts at 76 the hub member 44 in this return position, so that spring 72 does not preload washer spring 70.

A collar 78 is affixed to the output shaft 12 to maintain the axial position of the hub member 44 and sprocket 48.

The spring rate of the spring 70 and the clearance between the holes 68 and pin portions 66 are selected to produce the desired cam force for proper engagement of the armature 38.

It can be seen that this arrangement generates an axial spring force upon camming action of the balls and recesses which forces are exerted on the armature to increase the engagement pressure, but which force levels are limited by the positive stop engagement, at which point the axial spring force continues to be exerted to thus set the maximum cam created engagement forces regardless of increased torque over the levels required to create the positive stop.

This arrangement thus comprises a torque limited or "anti-jam" cam means, and torque can thus be increased without danger of jamming the balls, destroying the pole faces, or occasioning release failures.

Of course, the above embodiments have made reference to "input" or "output" shafts or members for the sake of clarity; but it will be understood that rotative power may be transmitted through the clutch in either direction. Thus, a "first" clutch member and a "second" clutch member could be utilized to refer to these members broadly.

Many variations of this concept are, of course, possible such as the limiting of axial movement rather than relative rotation. Similarly, the concept is not limited to the particular clutch type described, i.e. electromagnetic, but is applicable to other cam-torque responsive operators.

What is claimed is:

1. In an electromagnetic clutch including a rotatable first clutch member, an axially moveable ferromagnetic armature member, a rotatable second clutch member drivingly connected to said armature, and an electromagnetic coil means adapted to be energized to draw said armature axially into clutching engagement with said first clutch member, and also including torque responsive cam means mounted between said armature and said second clutch member to augment the electromagnetic engagement force between said armature and said input member upon engagement of said armature, the improvement comprising:
   cam torque limit means mounted between said armature and second clutch member, said limit means preventing relative rotational movement between said armature and second clutch member above a predetermined torque limit through said clutch to prevent an increase in camming force above the cam force existing at said predetermined torque limit.

2. The electromagnetic clutch according to claim 1 wherein, said cam limit means comprises a plurality of balls each disposed between sets of opposing conical recesses, said clutch including an intermediate member mounted to said second clutch member for rotational movement therewith, said one of the sets of said opposing conical recesses being formed in a radial face of said intermediate member and the other set of said opposing conical recesses formed in an opposing radial face of said armature member and wherein said intermediate member is mounted to be axially moveable relative said second clutch member, said cam torque limit means further including means creating an axial spring force on said intermediate member opposing relative axial movement of said intermediate member and said armature member, said axial movement created by camming action of said balls in said conical recesses, including;
   means for transmitting said spring force into said armature so as to augment said electromagnetic engagement force; and
   a positive stop preventing said relative rotational movement between said armature and said intermediate member after a predetermined extent of relative movement.

3. The clutch accordng to claim 2 wherein said means mounting said intermediate means to said second clutch member comprises a splined connection.

4. The clutch according to claim 3 wherein said positive stop comprises a plurality of pins fixed to said intermediate member and extending into holes formed in said armature with a predetermined clearance therebetween allowing said limited relative rotation therebetween.

5. The clutch according to claim 4 wherein said means creating said axial force comprises spring means engaging said intermediate member.

6. The clutch according to claim 2 wherein said means creating said axial force comprises spring means engaging said intermediate member.

7. In a clutch including a rotatable first clutch member, an axially moveable member, a rotatable second clutch member drivingly connected to said axially moveable member, and actuator means adapted to move said axially moveable member into clutching engagement with said first clutch member, and also including torque responsive means increasing the engagement force between said axially moveable member and said first clutch member upon engagement, the improvement comprising:
   torque limit means mounted between said armature and said axially moveable member, said limit means preventing relative rotational movement between said armature and second clutch member above a predetermined torque limit through said clutch to prevent an increase in camming force above the cam force existing at said predetermined torque limit.

* * * * *

UNITED STATES PATENT AND TRADEMARK OFFICE
CERTIFICATE OF CORRECTION

PATENT NO. : 4,187,938
DATED : February 12, 1980
INVENTOR(S) : Donald Leroy Miller It is certified that error appears in the above-identified patent and that said Letters Patent are hereby corrected as shown below:

Column 3, line 1, delete the word "position" and insert therefore ----positive----.

Column 4, line 36, delete the word "accordng" and insert therefore ----according----.

Column 4, line 37, delete the word "means" and insert therefore ----member----.

Signed and Sealed this

Third Day of June 1980

[SEAL]

Attest:

SIDNEY A. DIAMOND

*Attesting Officer*     *Commissioner of Patents and Trademarks*